Patented May 26, 1925.

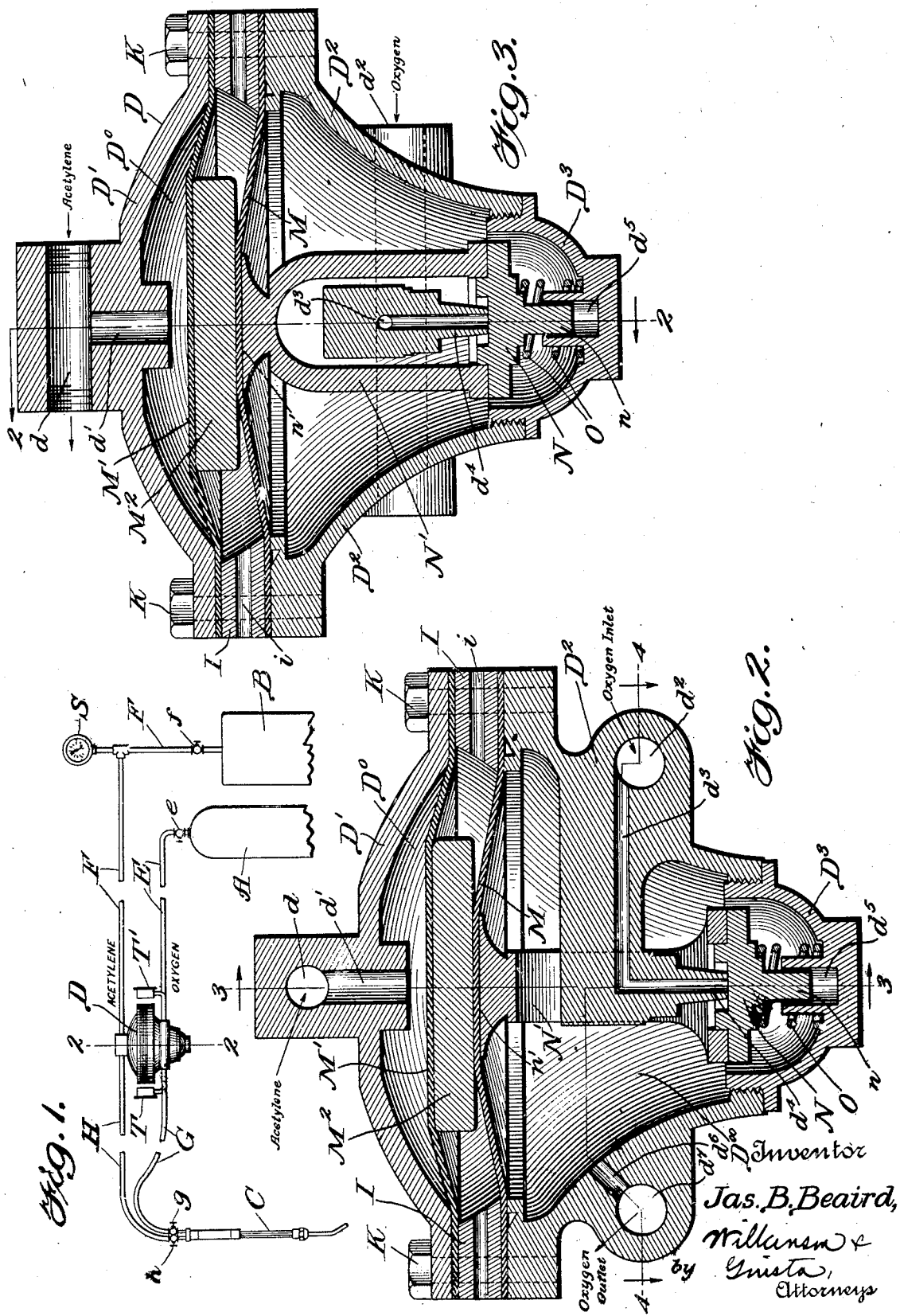

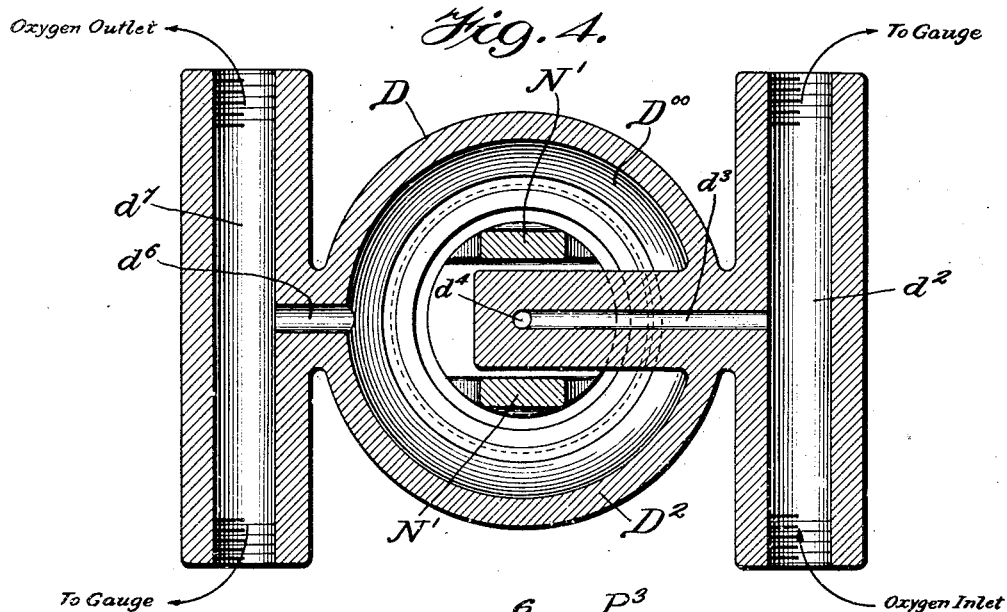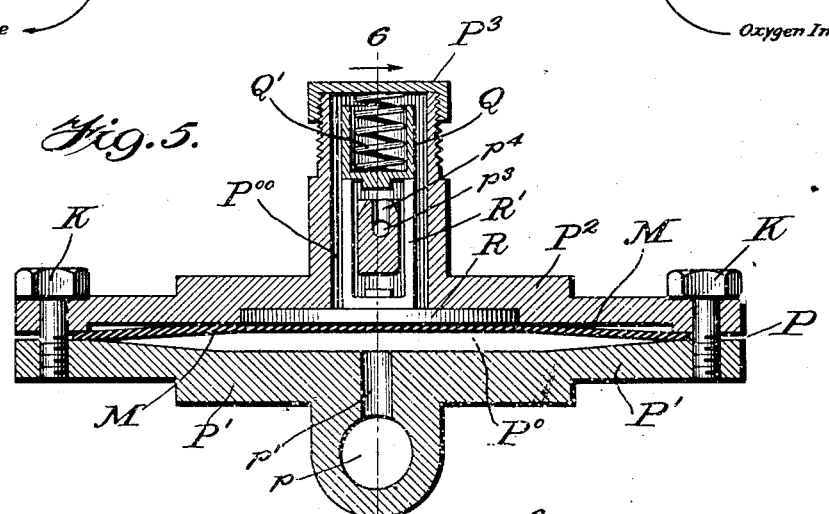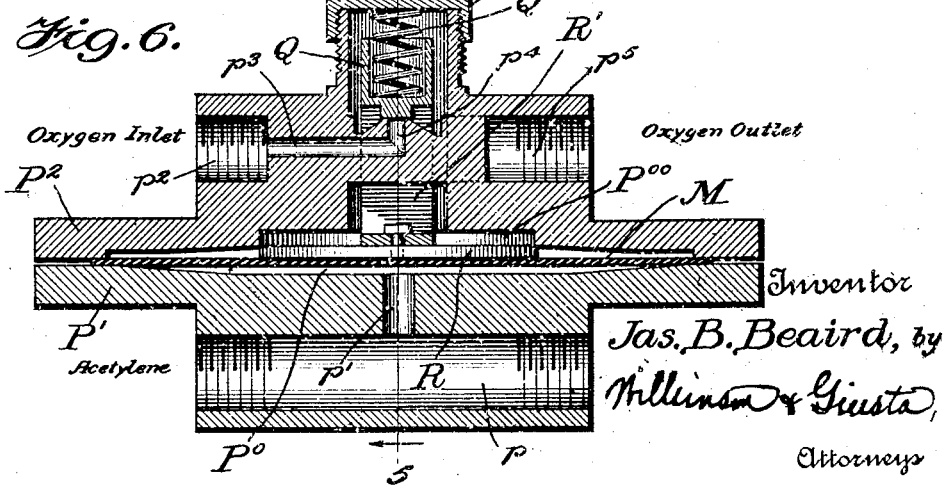

1,539,630

UNITED STATES PATENT OFFICE.

JAMES B. BEAIRD, OF SHREVEPORT, LOUISIANA.

PRESSURE-BALANCING VALVE FOR OXYACETYLENE WELDING.

Application filed December 20, 1921. Serial No. 523,800.

*To all whom it may concern:*

Be it known that I, JAMES BENJAMIN BEAIRD, a citizen of the United States, residing at Shreveport, in the parish of Caddo and State of Louisiana, have invented certain new and useful Improvements in Pressure-Balancing Valves for Oxyacetylene Welding; and I do hereby declare the following to be a full, clear, and exact description of the invention, such as will enable others skilled in the art to which it appertains to make and use the same.

My present invention relates to improvements in automatic pressure balancing valves for use in apparatus in which it is intended to regulate the relative proportions of two gases, such as oxygen and acetylene gas, or the like. The said invention is especially intended to control the pressure of gases delivered to blow pipes and other instruments using two or more gases, where delivery of the respective gases to the torches is desired under constant relative pressures.

This invention is primarily for use in connection with blow pipes, welding torches, cutting torches, lead burning torches and other instruments which burn a mixture of oxygen and acetylene, or other combustible gas; the main objects of the invention being to attain constant relative pressures of the gases delivered to the torch, permit a free and unobstructed passage of the combustible gas, prevent the occurrence of flashbacks, reduce the consumption of gases and reduce the number of lines of hose or other mediums necessary to supply cutting torches or other torches wherein oxygen is used at two pressures simultaneously.

The pressures recommended by the manufacturers for use with various torches are purely arbitrary and may be varied within certain limits. For instance, an acetylene pressure of 10 pounds and oxygen pressure of 8 pounds may be recommended to be used with a certain nozzle, while an increase or decrease of 25% in each of these pressures would give as good results so far as the quality of the flame is concerned, as only the intensity of the flame will be changed so long as the relative pressures and with it relative volumes of the gases delivered are maintained.

Pressure gages used on such apparatus will not remain accurate and cannot be depended upon to gage the pressures of the gases delivered, so it has become general practice with skilled welders to adjust the pressure regulators at a pressure approximately correct but somewhat greater than is required for the largest nozzle furnished, and to throttle this pressure to that required by the nozzle in use by using the torch needle valve, regulating the intensity of the flame to suit the work at hand, and judging the quality of the flame by observation.

A neutral flame, or one consuming equal volumes of oxygen and acetylene, is most essential in making good welds, and is the limit of economy in consumption of gases. Under operating conditions, a torch will not snap out or back-fire until the flame becomes oxidizing, or supplied with oxygen in excess of that required to produce a neutral flame. Either an excess of oxygen or acetylene will impair the quality of the weld by oxidizing or carbonizing the metal. Any time lost by the operator in adjusting his torch to produce a neutral flame or to extinguish a back-fire and relight his torch is very uneconomical, as it is of the utmost importance that the flame be played steadily upon the metal for as the omission of the flame for only a very short time will permit the weld to cool rapidly owing to the heat conduction qualities of the metal.

Well designed oxygen regulators are very effectual in controlling oxygen pressures, as this gas is furnished by manufacturers in a high state of purity, and is especially free from any foreign matter in either a liquid or solid state to interfere with the operation of the regulator. The accurate control of acetylene pressures presents a very difficult proposition, regardless of whether the supply is obtained from storage cylinders or direct from generators. When used from cylinders, the regulators are affected by the acetone that is intermittently drawn from the cylinder along with the gas, causing the pressure to fluctuate. A variation of one or two pounds in operation of a generator is inherent to its operation.

An acetylene regulator placed in the acetylene line does not prove effective owing to the impurities in the gas, and even though reasonably effective, is detrimental, as it causes considerable friction and resultant drop in line pressure. This fluctuation in pressure necessitates the constant manipulation of the torch valves in order to maintain a neutral flame and results in great loss of time, waste of gas, and in many cases, results in defective welds.

Instead of endeavoring to regulate the acetylene pressure, I have conceived the idea of permitting it to fluctuate within the bounds, and to use the pressure of the acetylene gas to regulate the pressure of the oxygen gas, which is more readily controlled. This may be done mechanically in a number of ways, and while I do not confine myself to any particular type of regulator, I have invented what may be termed a "Pressure balancing valve" that I find very effective, and which will now be described.

My invention will be more fully understood after reference to the accompanying drawings, in which like parts are indicated by similar reference symbols throughout the several views, and in which:

Figure 1 is a diagrammatic view showing the complete apparatus, parts being broken away.

Figure 2 shows a section through the casing containing the balancing valve, the section being along the line 2—2 of Figures 1 and 3, and looking in the direction of the arrows.

Figure 3 shows a section along the plane at right angles to the plane of Figure 2, such section being along the line 3—3 of Figure 2, and looking in the direction of the arrows.

Figure 4 shows a section along the broken line 4—4 of Figure 2, and looking in the direction of the arrows.

Figure 5 shows a vertical section through a modified form of balancing valve, parts being shown in elevation, the section being taken along the line 5—5 of Figure 6, and looking in the direction of the arrows; and Figure 6 shows a section along the line 6—6 of Figure 5, and looking in the direction of the arrows.

Figure 5 shows the oxygen valve in the open position; and Figure 6 shows the oxygen valve in the closed position.

Referring now to the construction shown in Figs. 1 to 4, A shows the tank for the oxygen gas and B shows the source of supply of acetylene, which may be a generator, tank or the like.

C shows the torch which may be of any suitable or preferred construction.

D shows the valve casing for the balancing valve, which casing is connected to the oxygen tank by the pipe E and to the source of supply of acetylene by the pipe F, and this casing is also connected to the torch C by the pipes G and H. These several pipes are controlled by the valves $e$, $f$, $g$ and $h$, respectively, and suitable gages are supplied where required, as indicated in the pipe F by the gage S and in the pipe E by the gage T, and in the pipe G by the gage T'.

The valve casing D is provided with a cap D' containing the passage $d$ for the acetylene gas, and with a lower portion $D^2$ containing the passages for the oxygen gas as will be hereinafter described, and between these two is held a spacing ring I having outlets therethrough, such as $i$, to permit the escape of any gas that may leak through the diaphragms of the balancing valve, as will be hereinafter described.

The lower portion of the housing $D^2$ is closed by a cap $D^3$. The parts D' and $D^2$ are secured together in any convenient way, as by the bolts K. Held between these two parts D' and $D^2$ and the spacing ring I are the two diaphragms M and M', between which the spacing disk $M^2$ is mounted. These diaphragms M and M' are made of rubber, or other suitable flexible material and the spacing disk $M^2$ may be of any suitable material, such as wood, metal or the like.

The acetylene gas flows through the passage $d$ in the cap D', and there is a branch $d'$ from this passage $d$ which opens into the pressure chamber $D^0$ above the diaphragm M; and thus whatever the pressure of the acetylene in the system may be, this pressure will be transmitted to the upper surface of the diaphragm M. The oxygen gas is caused to press on the lower face of the diaphragm M' as follows: This gas flows from the tank A, past the gage T, see Fig. 1, and into the chamber $d^2$, from whence it is carried through the passages $d^3$ and $d^4$ to the top of the valve N, which is normally pressed upwards by the spring O. The lower end of this valve N passes down into a guide socket $d^5$ in the lower cap $D^3$. The upper end of this valve is provided with a yoke N' which has an upper bearing face $n'$ adapted to engage beneath the diaphragm M'. The part $n'$ has a wide bearing face so as not to cut or injure the rubber diaphragm M'.

When the valve N is pressed down by the pressure of the acetylene in the system, oxygen will flow into the pressure chamber $D^{00}$ and will escape through the passages $d^6$ and $d^7$, and will enter the pipe G, flowing past the pressure gage T'. Thus it will be seen that the oxygen will flow through the valve casing and reach the torch, the pressure and hence the flow of the oxygen being regulated by the pressure of the acetylene in the system.

It will be seen that as the pressure of the acetylene increases the pressure of the oxygen will also automatically increase, and as the pressure of the acetylene falls, the pressure of the oxygen will also automatically fall, so that there will be a balance of pressure in the system between the two gases; that is, after the valves are once set for any predetermined ratio, this ratio will be maintained, regardless of change of pressure in the acetylene system.

As is well known in this art, the pressure of the oxygen may be very readily controlled at all times, but the pressure of the acetylene, especially when used direct from generators, is apt to fluctuate very materially, and it is especially important to effect a properly proportioned flow of the two gases, irrespective of whatever may be the pressure in the acetylene system. This I accomplish with the apparatus just described.

In order to meet the requirements of manufacture of different torches, I may use two diaphragms whose effective areas are different. For instance, a certain torch may be required whose acetylene pressure is 25% greater than the oxygen pressure. In such case I would use a diaphragm M′ with an effective area of 25% greater than the effective area of the diaphragm M. For illustration, an acetylene pressure of 15 pounds upon the diaphragm M with an area of 16 square inches will exert a total pressure of 240 pounds, balancing a pressure of 12 pounds upon diaphragm M′ with an area of 20 square inches. In case the oxygen pressure required is greater than the acetylene pressure I reverse the positions of the diaphragms just referred to.

In the foregoing description I have described the use of two separate diaphragms, one pressed upon by the acetylene gas and the other pressed upon by the oxygen gas, with a space between the two diaphragms from which any leakage through either may escape; but where the ratio of pressures desired is one, a similar principle of balancing valve may be put into practice by using a single diaphragm, as is shown in Figs. 5 and 6, in which the valve casing P is composed of two members P′ and P² connected by the bolts K. In the member P′ passages $p$ for the acetylene gas and a branch passage $p'$ are provided as before, which branch passage opens into the pressure chamber P° for the acetylene gas. The oxygen gas enters the opening $p^2$ passing through the passages $p^3$ and $p^4$, and presses back the cap valve Q which engages the spring Q′, bearing against the cap P³. When this valve is lifted off its seat, the oxygen gas will flow from the passage $p^4$ into the oxygen pressure chamber P°° and thence it will escape through the passage $p^5$ to the pipe G, as before described.

With this arrangement a single diaphragm only is used, but as before the flow of the oxygen gas will be automatically controlled by the pressure of the acetylene gas in the system.

It will be noted that with both forms of the device the acetylene gas has a free and unobstructed passage through the regulator, and its pressure controls the flow of the oxygen gas through the system.

It will be obvious that while I have spoken of oxygen and acetylene gases, it will be possible in a system of this kind to control the flow of one gas by another, and it will be equally feasible to control the flow of the acetylene gas by the oxygen gas if desired by simply reversing the parts, or the action of the same.

The operation of the device is as follows:

The oxygen being supplied in the tank A at the usual or any desired predetermined pressure, and acetylene being generated in the tank B, the flow of the two is primarily controlled by the valves $e$ and $f$, and the acetylene gas freely passing through the regulator exerts a downward pressure on the upper diaphragm, or the upper part of the single diaphragm if one only is used, tending to press the said diaphragm down and to force the controlling valve to the open position against the action of this spring. This will permit the oxygen to pass the indicator T into the lower chamber D°° and to escape through the pipe G, past the pressure indicator T′ and thence to the torch.

At the torch, the acetylene or controlling gas will mix with the oxygen or controlled gas and the two will be burned in the usual way.

If it is desired to cut off the supply of the two gases this may be done by the valves $h$ and $g$.

For convenience in drawing the claims, I will refer to the gas or mixture of gases which normally flows freely through the regulator as the "controlling gas"; and the gas whose flow is regulated or controlled by the valve as the "controlled gas".

I do not mean to confine the invention to any particular design of balancing valve, or to the construction, combination and arrangement of parts herein described and shown, except as particularly pointed out in the claims, as various modifications might be made which could be used without departing from the spirit of my invention.

Having thus described my invention what I claim and desire to secure by Letters Patent of the United States is:—

1. A pressure balancing valve comprising a casing, a flexible diaphragm arranged in the casing and dividing the same into two chambers, a source of fluid communicating with one chamber for moving the diaphragm outwardly thereof, said casing having a neck in the other chamber in substantially coaxial alinement with the diaphragm opening away from the diaphragm and adapted to communicate a second source of fluid with the second chamber, a spring seated valve fitting against said neck for normally closing the same and arranged to move toward and from said diaphragm, and a direct connection between said diaphragm and said valve for unseating the latter upon the movement of the diaphragm toward said neck.

2. A pressure balancing valve comprising a casing, a flexible diaphragm secured in the casing and dividing the casing into two chambers, a source of acetylene in continuous communication with one chamber for moving the diaphragm in accordance with the pressure thereof, a neck having a passage extending into the other chamber of the casing and having an outlet to the chamber faced away from said diaphragm, a valve straddling said neck and connected for movement to said diaphragm, said valve adapted to seat against the open mouth of the neck passage, and spring means acting on said valve to close the same in direct opposition to the opening action of the diaphragm.

JAMES B. BEAIRD.